(12) United States Patent (10) Patent No.: US 8,315,276 B2
Friedrich (45) Date of Patent: Nov. 20, 2012

(54) TRANSMITTING DATA BETWEEN A BASE STATION AND A TRANSPONDER

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/049,764

(22) Filed: Mar. 16, 2011

(65) Prior Publication Data

US 2011/0217924 A1 Sep. 8, 2011

Related U.S. Application Data

(63) Continuation of application No. 10/503,256, filed on Aug. 30, 2004, now abandoned.

(30) Foreign Application Priority Data

Feb. 1, 2002 (DE) .................................. 102 04 347
Jan. 15, 2003 (WO) ....................... PCT/EP03/00312

(51) Int. Cl.
*H04J 3/00* (2006.01)
*H04J 3/06* (2006.01)
*H03C 5/00* (2006.01)
*H04L 27/02* (2006.01)
*H04L 27/04* (2006.01)
*H04L 27/06* (2006.01)

(52) U.S. Cl. ........ 370/474; 370/476; 370/509; 375/268; 375/300

(58) Field of Classification Search ......................... None
See application file for complete search history.

(56) References Cited

U.S. PATENT DOCUMENTS

| | | | |
|---|---|---|---|
| 3,257,644 A | 6/1966 | Moore | |
| 3,564,412 A | 2/1971 | Whang | |
| 4,007,329 A * | 2/1977 | McClain et al. | 375/356 |
| 4,631,538 A | 12/1986 | Carreno | |
| 5,084,871 A * | 1/1992 | Carn et al. | 370/462 |
| 5,362,954 A | 11/1994 | Komatsu | |
| 5,450,492 A | 9/1995 | Hook | |
| 5,526,357 A * | 6/1996 | Jandrell | 370/346 |
| 5,828,658 A * | 10/1998 | Ottersten et al. | 370/310 |
| 5,852,634 A | 12/1998 | Marshall | |
| 5,856,975 A * | 1/1999 | Rostoker et al. | 370/395.64 |
| 5,969,631 A | 10/1999 | Ammler | |
| 6,044,333 A | 3/2000 | Stobbe | |
| 6,147,719 A | 11/2000 | Shafer | |
| 6,212,230 B1 | 4/2001 | Rybicki | |
| 6,510,150 B1 | 1/2003 | Ngo | |
| 6,590,881 B1 * | 7/2003 | Wallace et al. | 370/332 |
| 7,027,773 B1 | 4/2006 | McMillin | |
| 2001/0019303 A1 | 9/2001 | Bruhnke | |
| 2002/0150123 A1* | 10/2002 | Ro | 370/465 |
| 2002/0163976 A1 | 11/2002 | Karthaus | |
| 2002/0191712 A1* | 12/2002 | Gaddam et al. | 375/301 |
| 2003/0133435 A1 | 7/2003 | Friedrich | |
| 2003/0137968 A1* | 7/2003 | Lareau et al. | 370/349 |

FOREIGN PATENT DOCUMENTS

DE 197 44 784 4/1999

(Continued)

*Primary Examiner* — Andrew Chriss
(74) *Attorney, Agent, or Firm* — Baker Botts L.L.P.

(57) ABSTRACT

In particular embodiments, an error correction during the transmission of the data word is made possible through the change of the modulation state at pre-defined time points.

20 Claims, 2 Drawing Sheets

FOREIGN PATENT DOCUMENTS

| | | |
|---|---|---|
| DE | 199 27 320 | 12/2000 |
| DE | 10 010585 | 9/2001 |
| DE | 101 21 855 | 2/2003 |
| DE | 101 38 217 | 3/2003 |
| EP | 0 473 569 | 3/1992 |
| EP | 0 542 229 | 5/1993 |

* cited by examiner

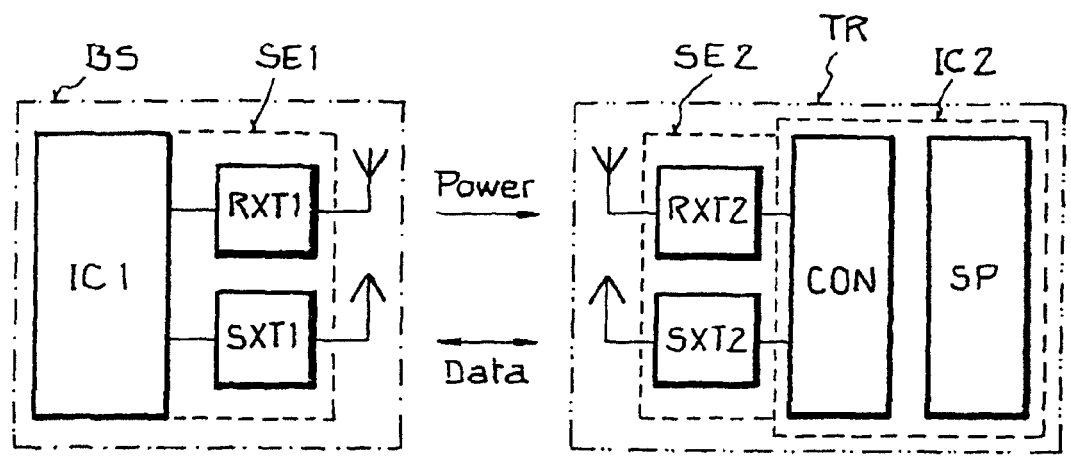
FIG. 1a
FIG. 1b
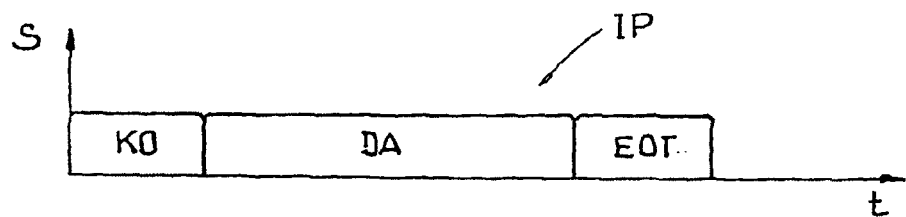

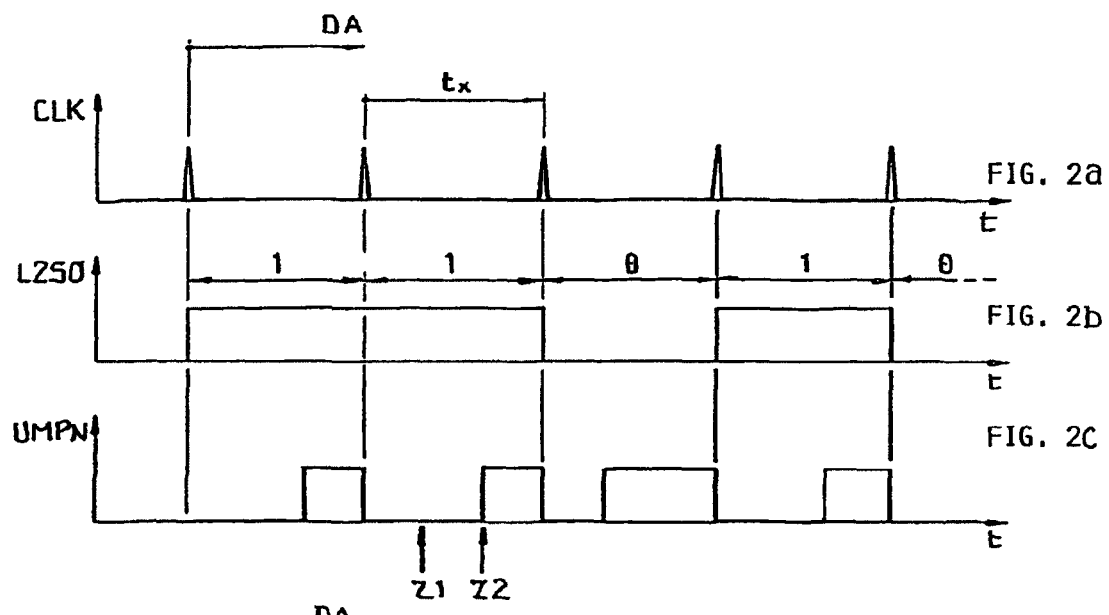
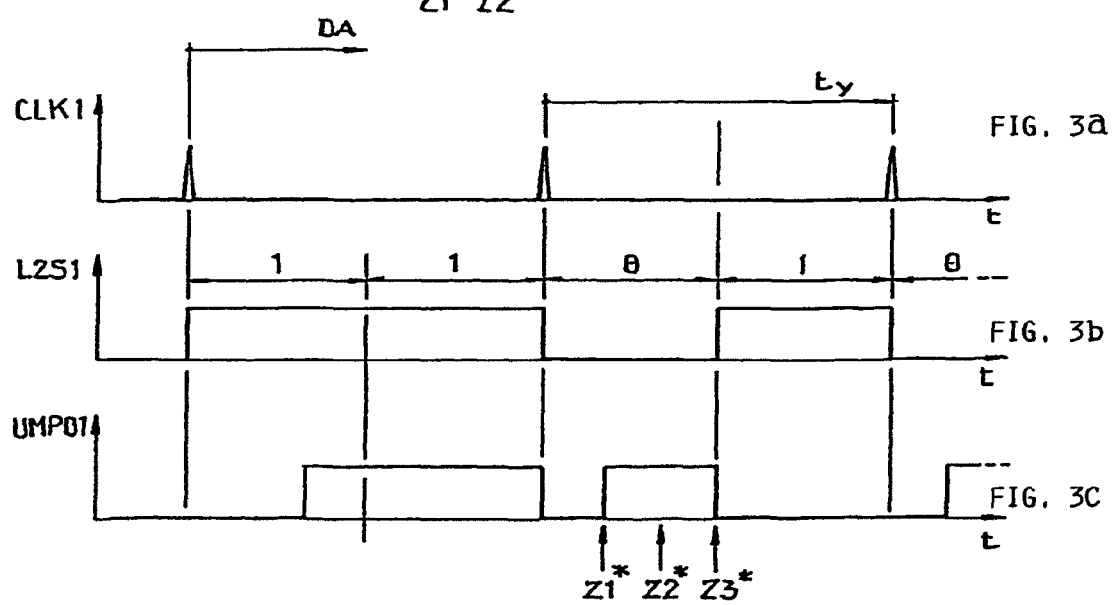

TRANSMITTING DATA BETWEEN A BASE STATION AND A TRANSPONDER

RELATED APPLICATIONS

This application is a continuation, under 35 U.S.C. §120, of U.S. patent application Ser. No. 10/503,256, filed 30 Aug. 2004 now abandoned, which claims the benefit, under 35 U.S.C. §365(a), of International Patent Application No. PCT/EP03/00312, filed 15 Jan. 2003, which claims the benefit of German Patent Application No. DE 102 04 347.7, filed 1 Feb. 2002.

TECHNICAL FIELD

This disclosure generally relates to the transmission of data between a base station and a transponder by a modulated electromagnetic wave.

BACKGROUND

Such a method is known from the publication DE 101 38 217.0. Therein, information packets are transmitted between a base station and a transponder. The information packets consist of a header section and a middle section with a data region. In the middle section, the data of the data region are encoded with the identifications allocated to the logic values of the information symbols in the header section. With different identifications of successive information packets, the data transmission rate can be adjusted. A disadvantage of the method is that disturbing or noisy interferences reduce the reliability of the data transmission in the communication due to reflections and/or absorptions when utilized in the range of UHF and higher frequencies. For the correction of the read errors, the entire data packet must be transmitted.

A further method for the transmission of data is represented in the publication DE 101 21 855.9. Therein, the modulation voltage is switched or alternated between two values with each new bit in the bit sequence of the data word, independent of the logic values of the data bits. Thereby, the phase position or phase angle is changed in a phase modulated carrier wave.

A further method is known from the publication EP 473, 569 B1. Therein, digital data are exchanged between a base station and a passive transponder by means of an amplitude modulated carrier wave. The individual bits of a data word consist of a time span or interval in which the electromagnetic field is switched on and a time span or interval in which the electromagnetic field (field gap or notch) is switched off, whereby the field gap serves as a separator between two successive bits. The logic value of the bits is determined by the length of the time in which the electromagnetic field is switched on. The fixed time amount of the field gap is summed or additionally counted for the total time for the representation of the individual bits. Furthermore, in the passive system, the energy for the transponder is acquired out of the carrier field by means of absorption modulation.

OVERVIEW

Due to the increasing security or safety demands, a plurality of information packets must be modulated onto a carrier wave in ever-shorter time spans or intervals. Predominantly the amplitude modulation (ASK) is utilized for the modulation. In order to achieve a higher data transmission rate and a higher transmission distance or range, carrier frequencies in the range of UHF and microwaves are being increasingly utilized in the field of the transponders, whereby the various different national HF regulations must be taken into consideration the data rate through the prescription of the frequency bands. Predominantly ASK and phase modulation techniques find application in the UHF and microwave range, whereby ASK is preferred due to the simple implementability in connection with CMOS. The basic foundation of the bi-directional data transmission between transponder and base station is formed by a data protocol, which, among other things, sets or fixes the number of the information symbols, such as for example the logic values per data bit, and also defines the identification of the individual symbols. Especially in the UHF range, read errors are caused in the data transmission due to change or variation of the transmission conditions as a result of reflections and the constructive and destructive interferences associated therewith. Because this results in a repeated transmission of the data word, the effective data transmission rate is considerably reduced.

A disadvantage of the previous methods is that the data transmission rate reduces insofar as the protocol for the data transmission satisfies various different national regulations, because an adaptation to the narrowest bandwidth results. Furthermore, the effective data transmission rate is reduced especially in the range of very high frequencies due to the fluctuating transmission conditions. The reduction of the data transmission rate is noticeable in a disturbing or interfering manner especially in time-critical applications.

It is an object of particular embodiments to set forth a method for the transmission of data, which increases the reliability of the data transmission and can be carried out in a simple and economical manner.

In particular embodiments, this object is achieved according to the invention in a method for the transmission of data between a base station and a transponder by means of an electromagnetic wave, in which information packets are modulated onto the electromagnetic wave, which information packets comprise a header section with a data symbol and a data section with a data word, whereby the data symbol comprises plural logic values, and the data of the data section are encoded as a bit sequence of the data word by means of the logic values and are transmitted in reference intervals generated by successive clock pulses, characterized in that for the differentiation of the logic values of the data symbol, in the header section, a time point derived from the time duration of the reference interval is allocated to each logic value, and at least one bit is transmitted within the reference interval, and the modulation of the electromagnetic wave is changed at the time point allocated to the logic value of the bit.

In particular embodiments, the change or variation of the modulation states occurs at fixed time points in a contactless data transmission by means of an electromagnetic wave. For this purpose, information packets are modulated onto the electromagnetic wave by a base station and a transponder. The information packets comprise a header section with a data symbol and a data section with a data word, whereby the data symbol comprises plural logic values and the data of the data section are encoded as a bit sequence of the data word by means of the logic values and are transmitted in reference intervals generated by successive timing or clock pulses. For this purpose, for differentiating the logic values of the data symbol, in the header section a time point derived from the time duration of the reference interval is allocated to each logic value and at least one bit is transmitted within the reference interval. Moreover, the modulation of the electromagnetic wave is changed at the time point allocated to the logic value of the bit.

An advantage of the new method is that, corresponding to the time points defined in the header section, in the data word, for the decoding of the data, the data word is examined for a change of the modulation only at certain time points. Especially in the UHF and microwave range, read errors are reliably suppressed and therewith the reliability of the data transmission is considerably increased. Disturbing interferences, for example due to reflections, are substantially suppressed, because no integration of the time intervals allocated to the logic values must occur. The fixed specifying of interval regions or ranges as required in the previous methods, and the time length of the intervals associated therewith dependent on the logic value of the bits, is omitted or avoided. Moreover, the demodulation of the carrier wave in connection with the integration of the time intervals is omitted or avoided. Especially with a phase modulation, thereby the effective data transmission rate can be increased by means of the reliability thereof. Furthermore, the error rate in the demodulation can be reduced through an evaluation of the time and of the frequency domain of the received wave. In this regard, the direction of change of the modulation is insignificant, because it only depends on the change at a prescribed time point. Furthermore, the baud rate can be adjusted and the detection of the modulation change can be tuned or adapted to time points that are favorable for the respective communication system. Through a change of the reference interval, these may be changed just as by a different selection of the time point itself. The timing or clock signals may, for example, be derived from the system clock or by means of an oscillator.

In a further embodiment of the method, two bits are transmitted within the reference interval. For this purpose, the modulation is changed at the time point allocated to the logic value of the first bit, and insofar as the second bit comprises a different logic value, the modulation is again changed at the half time duration of the reference interval. It is advantageous that hereby the data transmission rate is considerably increased, because the doubled number of bits is transmitted within a reference interval.

In a different embodiment of the method, the modulation of the electromagnetic wave begins with a prescribed modulation state in the transmission of the first bit of the data word. It is advantageous that it is defined by the prescribed modulation state, in which direction the modulation state changes at the time point allocated to the logic value of the bit. Hereby, changes or variations that arise from super-positions and reflections, and lead to inversions of the received signal state, can be corrected in a simple manner.

In an embodiment of the method, for adjusting or setting the spacing distances of the sidebands relative to the center frequency of the modulated electromagnetic wave, the length of the reference interval is changed. Hereby the positions of the sidebands can be adapted in a simple manner to various different national HF regulations. Since the time points at which the modulation state changes are defined as a part of the time interval, the Fourier components of the time points always lie closer to the center frequency of the carrier wave than the Fourier components of the time interval itself. Especially in connection with a collision in the communication, the base station is in the position to prevent a communication blockade through the possibility of a spectrum management.

In a different embodiment of the method, the size or magnitude of the reference interval is determined from the size or magnitude of the time interval of two successive synchronization signals. The data transmission rate can be changed or varied by the transmitter in a simple manner, especially in a synchronous data transmission in which the timing or clock signals additionally provided by the transmitter are used in the receiver for the synchronization or for example for the demodulation. Hereby the data transmission rate can be adapted to the transmission conditions or to the system characteristics of the receiver. Furthermore, in connection with passive or semi-passive transponders, the energy absorption from the field can be positively influenced by the base station through an adaptation of the data transmission rate under unfavorable transmission conditions.

Investigations of the applicant have shown that it is especially advantageous to store, in a volatile memory in the transponder, the time points transmitted by the base station in the header section of an information packet for the decoding of the data word. Thereby, a read-only memory becomes unnecessary in the transponder. Through the achieved simplification of the integrated circuit, the current consumption is reduced and especially in connection with passive transponders the communication distance or range is increased.

In an embodiment of the method, in the transponder, a value of a charge condition or state of a capacitor (peak detector) is allocated to the time point transmitted by the base station for the decoding of the data word. In this regard, the so-called RC-time of the capacitor is known. By means of a comparator, which compares the transmitted value of the charge state with the actual value of the capacitor, the encoding or decoding can be exactly controlled, in that the modulation state is changed or the modulation state is detected respectively at the prescribed time point.

BRIEF DESCRIPTION OF THE DRAWINGS

This disclosure shall be explained in the following on the basis of the example embodiments in connection with several schematic drawings. It is shown by:

FIG. 1a an arrangement with a base station and a passive transponder, and

FIG. 1b the construction of a data word, and

FIG. 2a a clock signal received by the transponder, from which a time interval is defined, and FIG. 2b a binary data stream in the transponder for the encoding of the electromagnetic carrier wave of the base station with respectively one bit per time interval, and FIG. 2c the modulation signal for the modulation of the electromagnetic wave, and FIG. 3a a second clock signal of the base station received by the transponder, and FIG. 3b a binary data stream in the transponder for the encoding of the electromagnetic carrier wave of the base station with respectively two bits per time interval, and FIG. 3c the modulation signal for the modulation of the electromagnetic wave.

DESCRIPTION OF EXAMPLE EMBODIMENTS

An arrangement for the data transmission between a base station BS and a passive transponder TR is depicted in FIG. 1a. In this regard, the transponder TR takes its energy out of the carrier wave of the base station BS. Such systems are used, among other things, in the field of the motor vehicle, whereby the transponder is installed in the door key and the base station BS is installed in the car. The base station BS comprises an integrated circuit IC1, that controls a transmitting and receiving unit SE1 with a transmitting part SXT 1 and a receiving part RXT1. For the transmission of data, the base station transmits or emits a modulated carrier wave, that is received by the transponder TR by means of a transmitting and receiving unit SE2, that comprises a receiving part RXT2 and a transmitting part SXT2, and that is directed further to a control unit CON for the evaluation, whereby the transmitting and receiving unit SE2 furthermore absorbs the energy necessary for the supply of the transponder TR. Further, the integrated circuit IC2 consists of the control unit CON and a memory unit SP, in which, among other things, the initial characteristic values of a protocol utilized for the data transmission of information packets are stored.

A schematic transmission protocol is illustrated in FIG. 1b. Accordingly, an information packet IP consists of a header section KO, a data region DA, and an end of the text region EOT. The number of the symbols and their identification are defined in the header section KO. Moreover, the header section KO can be used for the synchronization of the data protocol. The data to be transmitted are encoded in the data region with the identification. The end of the information packet is communicated or reported to the receiver with the EOT region via a prescribed identification. In the further specifications, the method according to particular embodiments is explained by means of a synchronous data transmission. In this regard, the base station BS transmits or emits timing or clock pulses CLK for the synchronization of the data transmission. The clock pulses CLK are used as trigger pulses for the demodulation. Furthermore, in the transponder TR, the time duration of two successive pulses is calculated, for example by means of an internal counter, which preferably derives from a system clock of the transponder TR, and is used as a reference length. If the transponder TR recognizes a data transmission, then at the beginning of the data transmission within the control unit CON, the protocol parameters are extracted out of the header section KO of the first incident information packet IP, and for example compared with the protocol values prescribed in the memory unit SP.

In FIGS. 2a-c, there are illustrated schematic signal progressions or courses in the transponder TR, by means of which the time points of the change of the modulation state of the electromagnetic wave for the transmission of a prescribed binary bit sequence of a reply signal of the transponder TR to the base station BS are derived. The time points are transmitted from the base station BS to the transponder TR in the header section KO of the information packet in the form of fractional parts of the 20 time interval Tx consisting of two successive clock signals. In the present example, the value ⅓ of the time interval Tx is allocated to the logic value "0", the value ⅔ of the time interval Tx is allocated to the logic value "1".

The clock signal CLK of the base station BS received by the transponder TR is illustrated in the FIG. 2a. The clock signals CLK comprise an equal or uniform interval interspace. The transponder defines for itself a time interval Tx from two successive clock signals CLK.

A data stream L2S0 that is transmitted back from the transponder TR as part of a data word to the base station BS is depicted in the FIG. 2b. In this regard, exactly one bit of the bit sequence is allocated to each time interval Tx.

The time progression or course of the modulation state UMPN is illustrated in the FIG. 2c. Corresponding to the logic value of the respective bit to be transmitted, the modulation state changes within the time interval Tx, either at a time point Z1 insofar as a logic zero is present, or at a time point Z2 insofar as a logic one is present. In this regard, at the beginning of each respective time interval Tx, a certain constant modulation state exists, that is to say the direction of the state change of the modulation is predefined or prescribed. For this purpose it is required at the outset, that the modulation state is changed back to the original value at the end of each respective time interval Tx.

In the example embodiment of the FIGS. 3a-c, the time progression or course of the signals for a transmission of two data bits per time interval Ty is illustrated. Building on the explanations made in connection with the drawing of the FIGS. 2a-c, in the following only the differences will be pointed out.

In the FIG. 3a, for reasons of clarity, the time axis t is extended or enlarged. The time intervals Ty result respectively from two successive clock pulses CLK1. In the FIG. 3b, in which the bit sequence L2S1 to be transmitted is illustrated, two data bits are allocated per time interval Ty. The time progression or course of the change of the modulation state UMP01 is illustrated in the FIG. 3c. In this regard, the modulation state for a logic one changes at a time point Z2*, which is given as ⅔ of the half of the duration of the time interval Ty, and for a logic zero at a time point Z1* as ⅓ of the half of the duration of the time interval Ty. If the two bits to be transmitted comprise the same logic value within one time interval, the modulation state is not changed in the middle of the interval. If the two bits comprise a different logic value, the modulation state is changed at a time point Z3*, which corresponds to the middle of the interval Ty.

It is an advantage of the method that it can be used for various different modulation methods such as PSK, ASK, FSK or mixed methods. Through the change of the modulation at defined time points in a prescribed direction, bit errors that arise especially at frequencies in the UHF range can be corrected already during the transmission of a data word. In this regard, the "online" correction can be checked by the testing or checking region (CRC). Through the correction, the reliability of the data transmission is considerably increased and the effective data transmission rate is increased.

The invention claimed is:

1. A method comprising:
receiving first and second time points through a header section of a data transmission, a first time point value of the first time point and a second time point value of the second time point each being a fractional portion of a reference time interval defined based on successive clock pulses;
allocating a first logic value to the first time point value and a second logic value to the second time point value;
encoding a first data bit through modulation of a carrier signal during the reference time interval according to:
switching, when the first data bit represents the first logic value, from a first modulation state to a second modulation state at the first time point within the reference time interval; and
switching, when the first data bit represents the second logic value, from the first modulation state to the second modulation state at the second time point within the reference time interval; and
transmitting the modulated carrier signal.

2. The method of claim 1, further comprising encoding a second data bit through modulation of the carrier signal during the reference time interval according to:
if a logic value of the second data bit is different from the logic value of the first data bit, then switching from the second modulation state to the first modulation state at a time that is approximately half of the reference time interval.

3. The method of claim 1, further comprising switching from the second modulation state to the first modulation state at an end of the reference time interval.

4. The method of claim 1, further comprising repeating encoding for each data bit of the transmitted carrier signal.

5. The method of claim 1, further comprising allocating a value of a charge state of a capacitor to the first and second time point values.

6. The method of claim 1, further comprising adjusting the reference time interval for setting a spacing of a sideband relative to a center frequency of the carrier signal.

7. The method of claim 1, further comprising storing the first and second time point values in a volatile memory.

8. A system comprising:
   a receiver configured to receive a data transmission, the data transmission comprising a header section including first and second time points, a first time point value of the first time point and a second time point value of the second time point each being a fractional portion of a reference time interval defined based on successive clock pulses;
   a controller configured to:
      allocate a first logic value to the first time point value and a second logic value to the second time point value;
      encode a first data bit through modulation of a carrier signal during the reference time interval according to:
         switching, when the first data bit represents the first logic value, from a first modulation state to a second modulation state at the first time point within the reference time interval; and
         switching, when the first data bit represents the second logic value, from the first modulation state to the second modulation state at the second time point within the reference time interval; and
   a transmitter unit configure to transmit the modulated carrier signal.

9. The system of claim 8, wherein the controller is further configured to:
   encode a second data bit through modulation of the carrier signal during the reference time interval according to:
      if a logic value of the second data bit is different from the logic value of the first data bit, then switch from the second modulation state to the first modulation state at a time that is approximately half of the reference time interval.

10. The system of claim 8, wherein the controller is further configured to encode the carrier signal by switching from the second modulation state to the first modulation state at an end of the reference time interval.

11. The system of claim 8, wherein the controller is further configured to repeat encoding for each data bit of the transmitted carrier signal.

12. The system of claim 8, wherein the controller is further configured to allocate a value of a charge state of a capacitor to the first and second time point values.

13. The system of claim 8, wherein the controller is further configured to adjust the reference time interval for setting a spacing of a sideband relative to a center frequency of the carrier signal.

14. The system of claim 8, wherein the controller is further configured to store the first and second time point values in a volatile memory of the system.

15. An apparatus comprising:
   means for receiving a data transmission, the data transmission comprising a header section including first and second time points, a first time point value of the first time point and a second time point value of the second time point each being a fractional portion of a reference time interval defined based on successive clock pulses;
   means for allocating a first logic value to the first time point value and a second logic value to the second time point value;
   means for encoding a first data bit through modulation of a carrier signal during the reference time interval according to:
      switching, when the first data bit represents the first logic value, from a first modulation state to a second modulation state at the first time point within the reference time interval; and
      switching, when the first data bit represents the second logic value, from the first modulation state to the second modulation state at the second time point within the reference time interval; and
   means for transmitting the modulated carrier signal.

16. The apparatus of claim 15, further comprises:
   means for encoding a second data bit through modulation of the carrier signal during the reference time interval according to:
      if a logic value of the second data bit is different from the logic value of the first data bit, then switching from the second modulation state to the first modulation state at a time that is approximately half of the reference time interval.

17. The apparatus of claim 15, further comprising means for encoding the carrier signal by switching from the second modulation state to the first modulation state at an end of the reference time interval.

18. The apparatus of claim 15, further comprising means for repeating encoding for each data bit of the transmitted carrier signal.

19. The apparatus of claim 15, further comprising means for allocating a value of a charge state of a capacitor to the first and second time point values.

20. The apparatus of claim 15, further comprising means for adjusting the reference time interval for setting a spacing of a sideband relative to a center frequency of the carrier signal.

* * * * *